Dec. 28, 1948.   H. W. DELANEY   2,457,132
METHOD OF MANUFACTURING TWIST DRILLS
Filed May 31, 1941   7 Sheets-Sheet 1
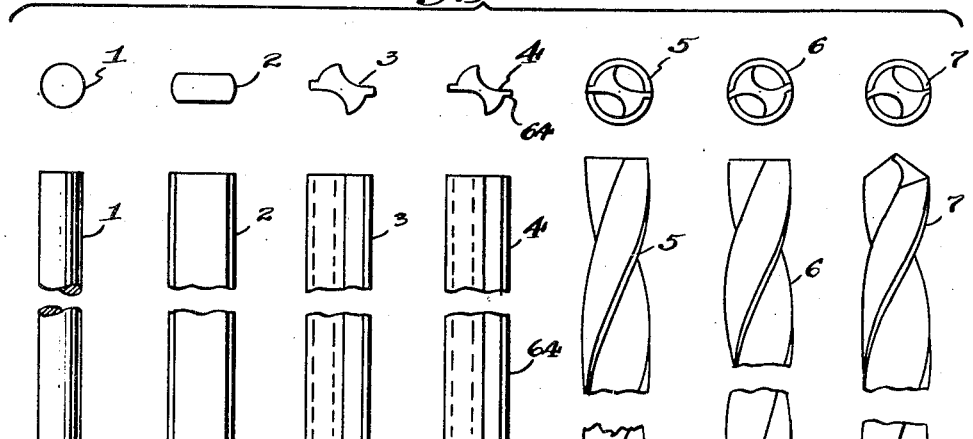
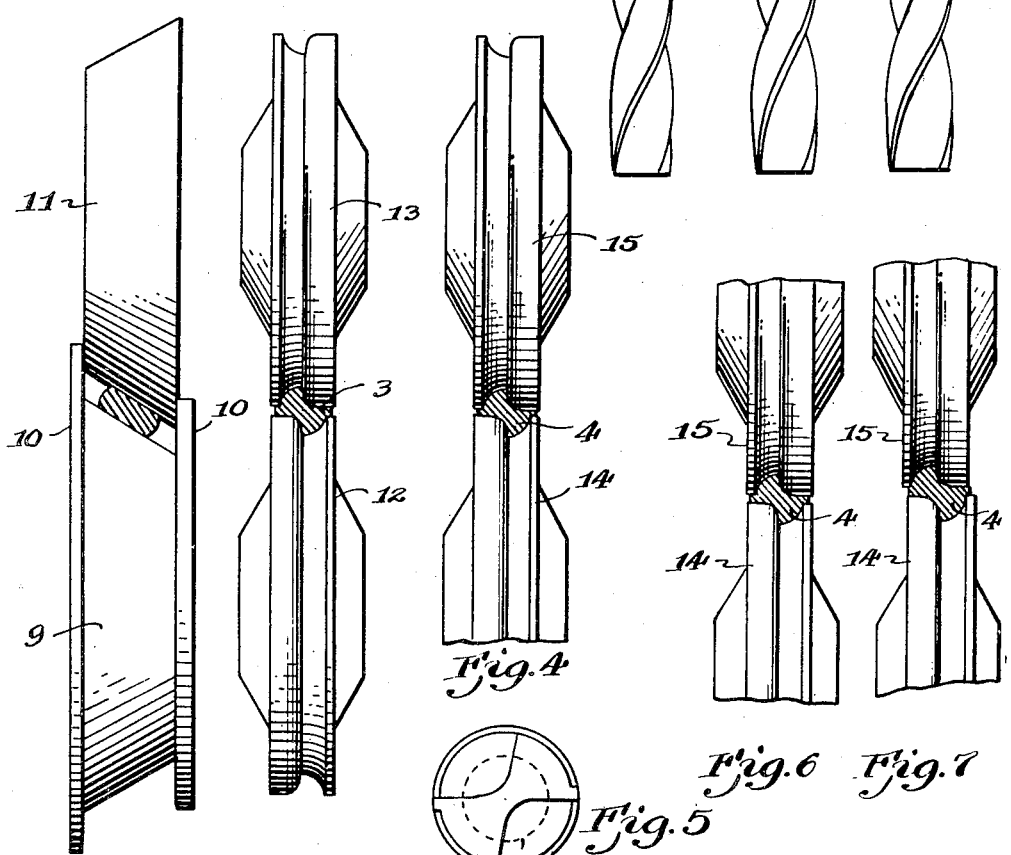
INVENTOR.
Harry W. Delaney
BY
Barnes, Kisselle, Laughlin & Raisch
ATTORNEYS Dec. 28, 1948.　　　　H. W. DELANEY　　　　2,457,132
METHOD OF MANUFACTURING TWIST DRILLS
Filed May 31, 1941　　　　　　　　　　　　7 Sheets-Sheet 2
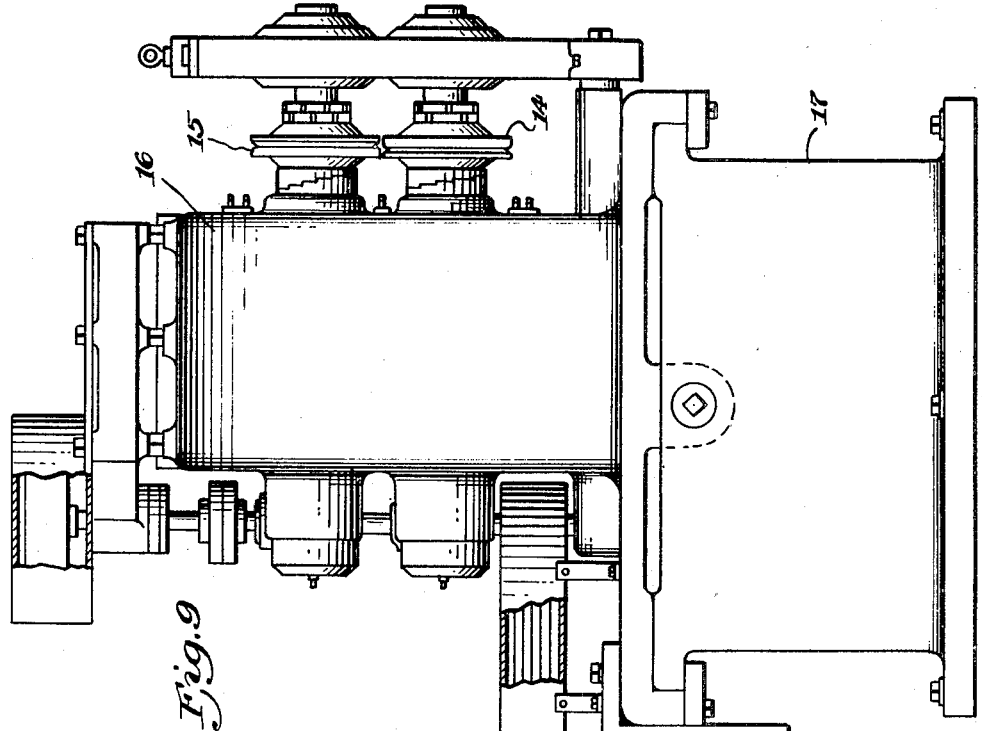
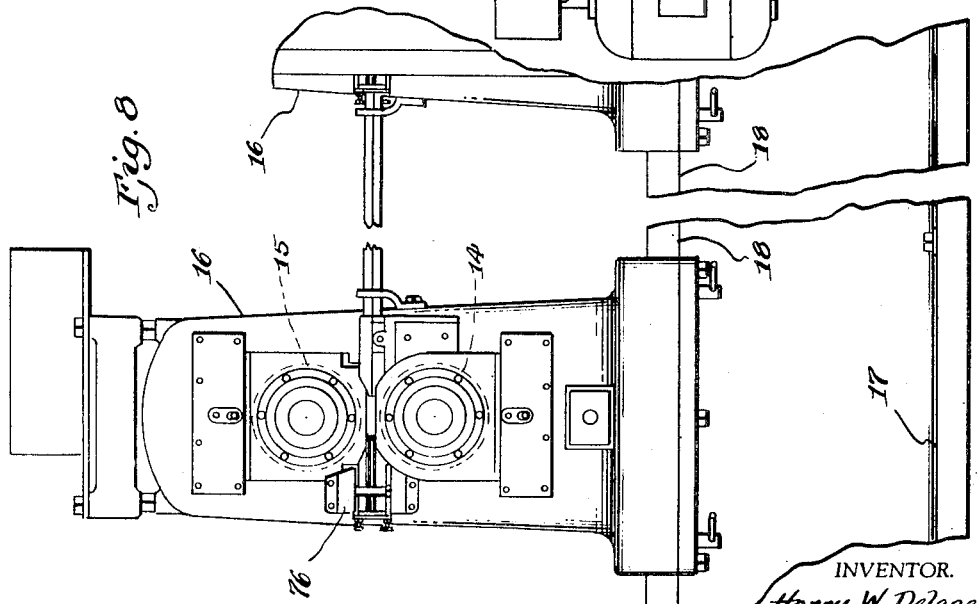
INVENTOR.
Harry W. Delaney
BY Barnes, Kisselle,
Laughlin & Rauch
ATTORNEYS

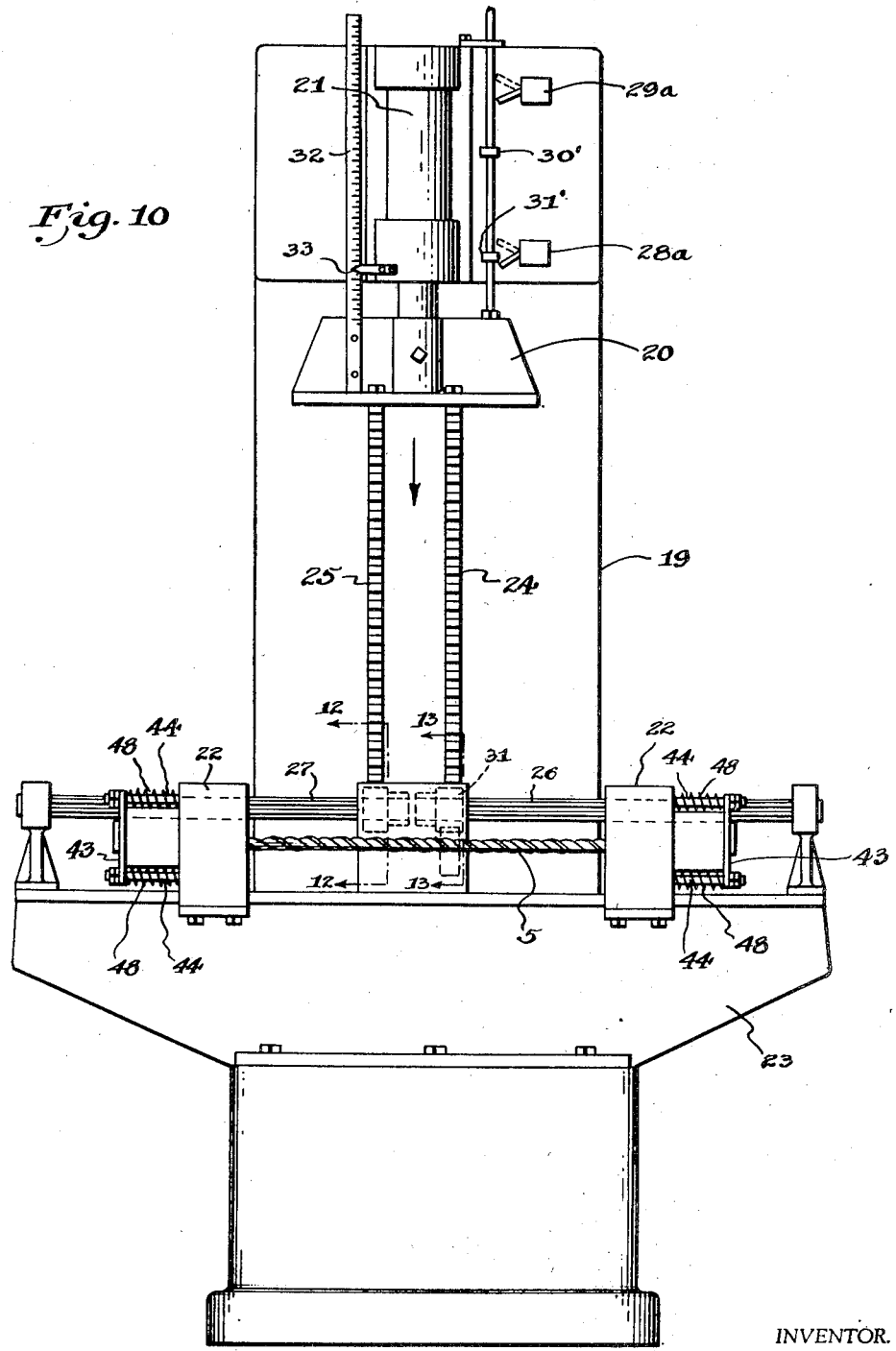

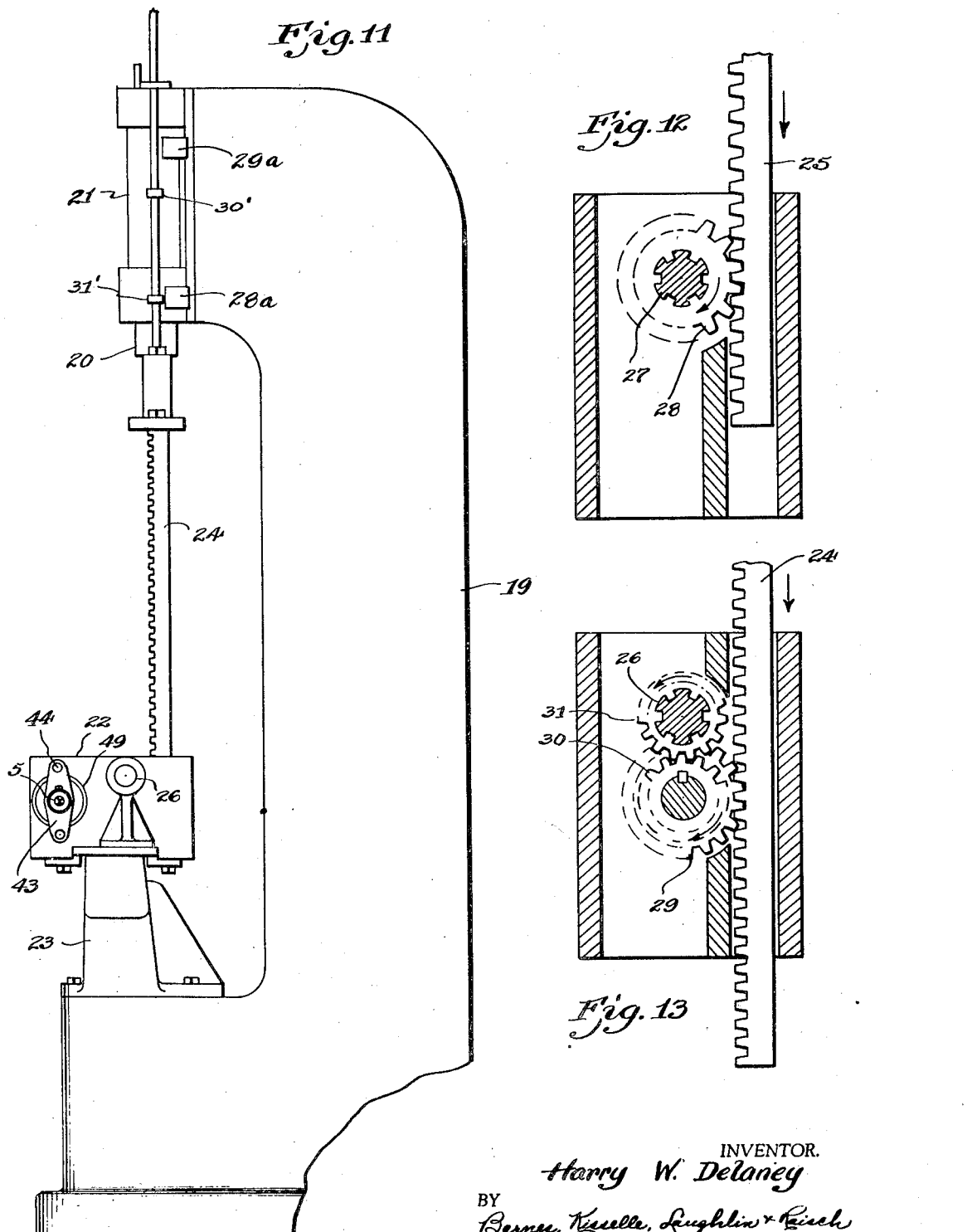

Dec. 28, 1948.   H. W. DELANEY   2,457,132
METHOD OF MANUFACTURING TWIST DRILLS
Filed May 31, 1941   7 Sheets-Sheet 5

INVENTOR.
Harry W. Delaney
BY Barnes, Kisselle, Laughlin & Raisl
ATTORNEYS

Dec. 28, 1948.  H. W. DELANEY  2,457,132
METHOD OF MANUFACTURING TWIST DRILLS
Filed May 31, 1941  7 Sheets-Sheet 6

INVENTOR.
Harry W. Delaney
BY
Barnes, Kisselle, Laughlin & Raisch
ATTORNEYS

Dec. 28, 1948. H. W. DELANEY 2,457,132
METHOD OF MANUFACTURING TWIST DRILLS
Filed May 31, 1941 7 Sheets-Sheet 7
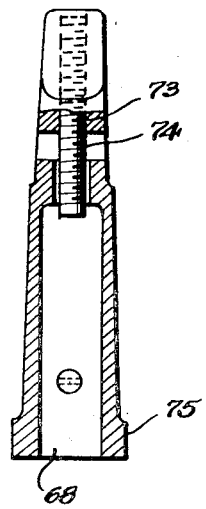
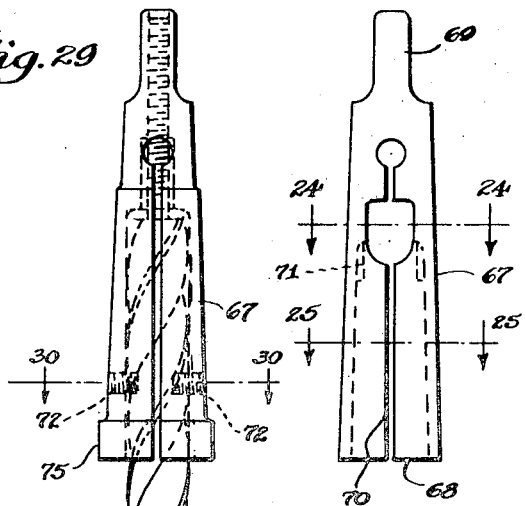
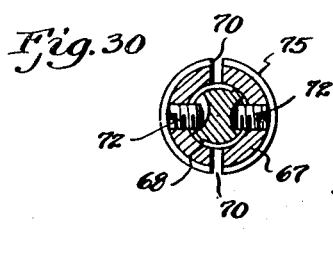
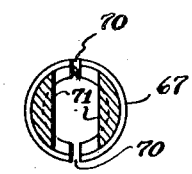
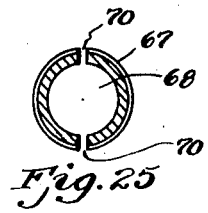
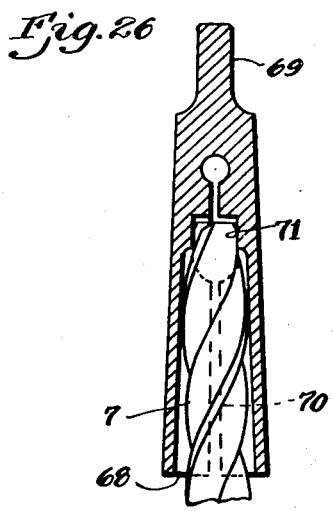
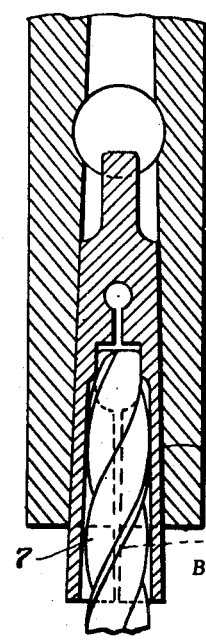
INVENTOR.
Harry W. Delaney
BY
Barnes, Kisselle, Laughlin & Raisch
ATTORNEYS Patented Dec. 28, 1948

2,457,132

UNITED STATES PATENT OFFICE 2,457,132

METHOD OF MANUFACTURING TWIST DRILLS

Harry W. Delaney, Chicago, Ill., assignor, by mesne assignments, to Republic Drill & Tool Company, a corporation of Delaware Application May 31, 1941, Serial No. 395,961

8 Claims. (Cl. 76—108)

This invention relates to improvements in drills and to an improved method for their manufacture.

Heretofore, the common commercial means of manufacturing drills has comprised milling them from bar stock of a diameter slightly larger than that of the finished drill. Drills have also been made by twisting stock.

It is proposed herein to manufacture twist drills from stock which is considerably smaller in cross section than the finished size of the drill by means of rolling grooves in the stock, twisting it and rolling the outside diameter. These twisted pieces of stock may be made up in any desired length, for example, between fifteen and sixty inches long. To complete the drill, it is necessary to cut these bars of stock to any desired length and then finish the drills by hardening, drawing, sand blasting, grinding the outer diameter, and pointing. This facilitates the speedy production and delivery of drills of odd lengths.

Drills manufactured by the method disclosed herein have a manufacturing cost of from one half to one third the cost of milled type drills. Contributing factors to this economy are the small size of stock used, the high rolling speed possible, and the fine grain structure given to the steel by rolling which obviates the necessity of purchasing ground and polished steel. In addition, long drills may be made substantially as cheap as short drills.

By means to be described herein, a very hard cutting edge is obtained. A novel holder is also provided which simplifies production by obviating the necessity of butt welding a shank. The holder also possesses other desirable features to be described herein. An air blast is used to equalize the heat of the bar stock preparatory to its being twisted so that twist of the drill will be uniform. In addition, rolls are provided which are adjustable in two directions to accommodate drills of various diameters, and a novel and flexible twisting means is disclosed. Further advantages of the method and apparatus will be apparent from the following description.

In the accompanying drawings:

Fig. 1 illustrates a side and end view of a bar of stock at the various stages of its manufacture into a completed drill.

Fig. 2 is an end view of the slabbing rolls.

Fig. 3 is an end view of the rough grooving rolls.

Fig. 4 is a partial end view of the finishing rolls.

Fig. 5 is a diagrammatic view showing that a drill is formed from stock of a smaller diameter.

Figs. 6 and 7 are partial vertical views of a pair of cooperating rolls adjusted in different vertical and horizontal directions to accommodate drills of different sizes.

Fig. 8 is a partial front elevation of a rolling mill.

Fig. 9 is an end view of a rolling mill.

Fig. 10 is a front elevation of a twisting machine.

Fig. 11 is a side elevation of a twisting machine.

Fig. 12 is a section on the line 12—12 of Fig. 10.

Fig. 13 is a section on the line 13—13 of Fig. 10.

Fig. 23 is a side view of a holder.

Fig. 24 is a section on the line 24—24 of Fig. 23.

Fig. 25 is a section on the line 25—25 of Fig. 23.

Fig. 26 is a sectional view of the holder of Fig. 23 showing the end of a drill positioned therein.

Fig. 27 is a vertical section similar to Fig. 26 but showing the drill retained in the holder by lateral pressure.

Fig. 28 is a sectional view of a modified form of drill holder.

Fig. 29 is a view of the holder of Fig. 28 with a drill positioned therein.

Fig. 30 is a section on the lines 30—30 of Fig. 29.

Figure 14:
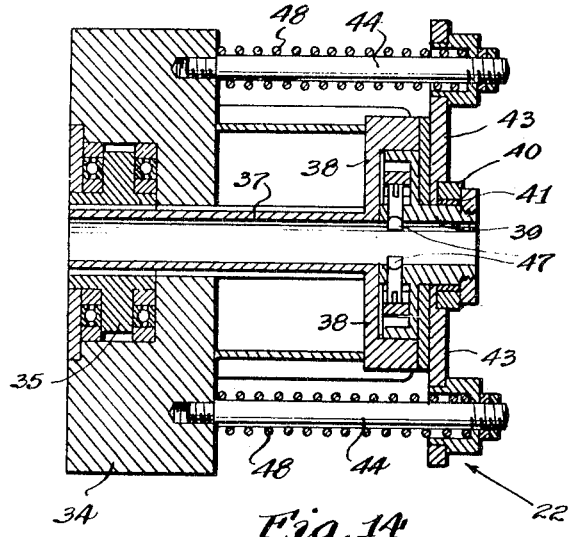
Fig. 14 is a vertical section of one twisting fixture used on the twisting machine, and taken on the line 14—14 of Fig. 15.

The method of manufacturing twist drills to be described herein comprises the following operations: Rolling the bar stock to give it a flattened cross section, rolling the flattened stock to flute it, twisting the fluted stock, rolling the outside diameter, cutting to lengths if required, hardening the twisted stock, and finishing the drill. In the preferred method the steps of rolling the stock to flute it, twisting and rolling the outside diameter are preferably all performed in one heat.

However, satisfactory results have been obtained where only the steps of rolling the stock to flute it and twisting it are performed in one heat. The stock is then annealed and the outside diameter rolled cold in this alternative method. In addition, the above operations produce beads along alternate edges of the flutes which, after hardening, have a portion thereof ground off to produce a cutting edge. The above operations may be performed on blank of any desired length which later may be cut to desired drill length. The drill may then be inserted in the holder adapted to receive it.

Referring to Fig. 1, a bar of stock is shown in progressive stages of its formation into a completed drill. The numeral 1 designates the bar stock from which the drill is to be made. This is illustrated as stock of circular cross section, but it is to be understood that stock of other cross section could be used. It should also be noted that the diameter of the stock is considerably less than the diameter of the finished drill. The numeral 2 designates the bar after it has passed through the slabbing rolls illustrated in Fig. 2. The numeral 3 designates the bar after passing through the rough grooving rolls. At 4 the bar is shown after having passed through the finishing rolls illustrated in Fig. 4. The numeral 5 designates the bar after the heat therein has been made uniform in a manner to be hereinafter described and the bar has been twisted. At 6 the bar is shown after the outside diameter has been rolled in the device shown in Figs. 18 and 19. The finished and pointed drill is shown at 7.

The bar stock shown by numeral 1 of Fig. 1 is heated to a suitable temperature, preferably between 1800° F. and 2100° F. to facilitate the mechanical working to which it is to be subjected by subsequent operations. In the preferred method all of the subsequent operations up to and including rolling the outside diameter are performed in this one heat. In an alternate method, however, satisfactory results have been obtained where only the steps up to and including twisting the stock are performed in this one heat. The stock is then annealed and the outside diameter rolled cold. After the bar stock is removed from the furnace it is fed to the slabbing rolls of Fig. 2.

The first or slabbing rolls are shown in Fig. 2. These rolls are preferably in the form of cooperating frustums. On of the rolls 9 is preferably provided with flanges 10 adapted to re-receive the cooperating roll 11. The flattened stock is in a tilted position when it emerges from these rolls so that it is in proper position to be fed to the rough grooving rolls 12 and 13 of Fig. 3. The stock is then fed through finishing rolls 14 and 15 of Fig. 4. It should be noted that the rolls of Figs. 3 and 4 cooperate to produce a pair of longitudinal flutes in the bar stock and to produce a bead on alternate edges of said flutes. No configurations on the surface of the rolls are necessary to produce these beads. If desired, the beads could be rolled thereon by a separate operation.

The rolls of Figs. 3 and 4 are preferably mounted so that they are relatively adjustable in either a horizontal or vertical direction. As shown in Figs. 6 and 7, such adjustment permits the reception of bar stock of larger diameter. The one set of rolls therefore may be used to produce drills of several desired sizes. The surfaces of rolls 14 and 15 of Fig. 4 are adapted to roll the stock to the shape designated by numeral 4 of Fig. 1. The rough grooving rolls of Fig. 3 and the finishing rolls of Fig. 4 are substantially identical except that the rolls of Fig. 4 are positioned closer together.

Referring to Fig. 5 it will be seen that the rolling operations just described increase the diameter of the drill over that of the original bar stock. The numeral 1 designates the bar stock before rolling and the numeral 4 designates the drill after it has passed through the finishing rolls of Fig. 4. Bar stock 1 also lengthens in rolling.

Fig. 9 is an end view of a rolling mill showing the rolls 14 and 15 therein and Fig. 8 is a partial side view of the same rolling mill. It will be noted that each pair of rolls is retained by a separate housing 16. Each housing 16 is slidably mounted upon a base 17 provided with ways 18. It is thus apparent that the housings may be adjusted relative to each other so that the distance between pairs of rolls is variable. This permits shortening the distance between pairs of rolls to accommodate bars of stock of shorter length so that the stock may run continuously through the rolls. The customary stripper is shown at 76 to prevent adhesion of metal to the rolls.

Following the above described rolling operations and before twisting the bar of stock, air is applied to the rolled fluted stock to equalize the temperature throughout its length so that the twist will be uniform. The end of the bar which was nearer the door of the furnace in the heating operation will be cooler than the end which was deep in the furnace. The application of air to the hotter end overcomes this. An ordinary air hose has been found quite satisfactory for this purpose.

Fig. 10 shows a front view and Fig. 11 a side view of the twisting machine. A hydraulic press frame 19 has a head 20 slidably mounted thereon and adapted to be actuated by the hydraulic cylinder 21 and piston (not shown). Twisting fixtures 22 are mounted upon a base member 23 fastened to the frame 19. The bar or drill to be twisted herein is shown at 5. This bar has each end retained in one of the twisting fixtures 22. Reciprocation of the press head 20 in a vertical plane is transmitted to rotary movement of chucks within the twisting fixtures 22 by means of gear racks 24 and 25, and suitable pinion gears. It should be noted that the twisting fixtures 22 are slidably mounted upon the base member 23. This permits bars 5 of different lengths to be accommodated. Splined shafts 26 and 27 transmit motion from pinion gears which engage the gear racks 24 and 25 to the twisting fixtures 22 and permit relative movement between the twisting fixtures and the splined shafts. The splined shafts are rotatably mounted in suitable bearings as shown. It will be apparent that the amount of vertical movement of the head 20 determines the number of revolutions of the chucks in twisting fixtures 22 and therefore the amount of twist in the drill 5. Suitable limit switches 28a and 29a are adapted to stop movement of the head when engaged by adjustable members 30' and 31' which reciprocate with the head. It is also desirable to provide a scale 32 and pointer 33 to indicate to the operator the lead or pitch that he is imparting to the bar being twisted. The scale 32 is fastened to the reciprocating head and the pointer is fastened to a stationary object, such as the frame 19. The calibrations are preferably in terms of twist or pitch.

Figs. 12 and 13 illustrate the means of converting the linear motion of the gear racks 24 and 25 into the desired rotation of splined shafts 26 and 27. In Fig. 12 a pinion gear 28 is keyed to the splined shaft 27 and engaged by the gear rack 25. In Fig. 13 additional pinion gears must be provided so that the direction of rotation of the splined shaft 26 will be opposite to that of the splined shaft 27. To this end a pinion gear 29 is engaged by gear rack 24 and rotates a pinion gear 30 keyed thereto. The gear 30 engages a gear 31 on the splined shaft 26. The relative diameters of these gears may be chosen by empirical means in accordance with the amount of rotation desired.

Figure 16:
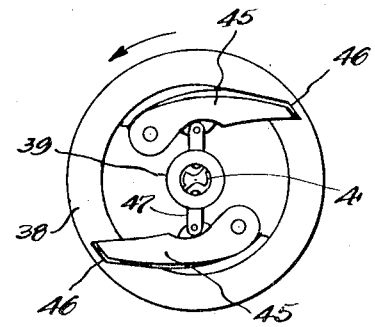
Fig. 16 is an end view of the chuck showing it in open position.
Figure 17:
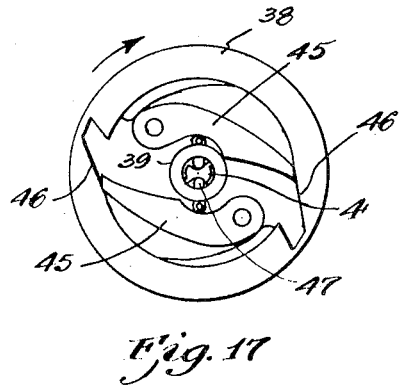
Fig. 17 is an end view of the chuck showing it in closed position.
Figure 15:
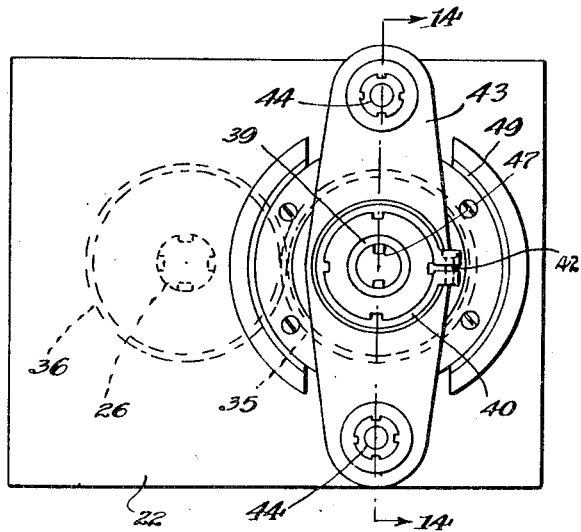
Fig. 15 is an end view of one twisting fixture.

Illustrated in Figs. 14 through 17 is one of the twisting fixtures 22. The twisting fixtures comprise self-locking and unlocking chucks which grasp the straight rolled fluted bar at each end and twist the same, simultaneously moving towards each other as the bar shortens in twisting. At the completion of the twisting the fixtures automatically release the drill and return to starting position leaving the chuck clear to permit removal of the twisted bar or drill. A twisting fixture 22 illustrated in Fig. 14 comprises a housing 34. A pinion gear 35 is rotatably mounted in the housing 34 and adapted to be actuated by rotation of the splined shaft 26. Suitable intermediate gears 36 diagrammatically illustrated by dotted lines in Fig. 15, cause rotation of gear 35. Gear 35 is slidably keyed to a hollow shaft 37 which is an extension of a cylindrical outer chuck housing 38. A hollow inner chuck housing 39 is prevented from rotating by a stationary brake ring 40 which may be provided with a brake lining 41 and an adjusting screw 42. Arcuate bushings 49 are provided to retain the chuck elements. Brake ring 40 is rigidly fastened to a member 43 which is slidably mounted on a pair of parallel shafts 44. Referring to Figs. 16 and 17, a chuck proper is illustrated. The fluted shaft 4 which is to be twisted is received by the hollow inner chuck housing 39 and extends through the hollow shaft 37 shown in Fig. 14. Pivotally mounted on inner chuck housing 39 are fingers 45. Outer chuck housing 38 is provided with recesses 46 adapted to engage the ends of fingers 45 and pivot them outwardly when the relative rotation of the housings is in one direction (Fig. 16). When the outer chuck housing is rotated in the direction shown in Fig. 17, the fingers 45 engage the inner surface thereof and are forced pivotally inward toward the axis of the housings. Small pins 47 slidably project through the inner chuck housing 39 and are adapted to engage the flutes of the bar or drill 4. Each pin 47 is pivotally fastened to one of the fingers 45. It is therefore apparent that the pivotal motion of the fingers 45 described above, will cause the pins 47 to engage or completely disengage the bar or drill 4. When disengaged as shown in Fig. 16 they are retracted into the inner housing and permit free removal of the drill. Since shaft 37 is slidable relative to gear 35 and member 43 is slidable relative to shafts 44, it is apparent that as the frame head 20 of the hydraulic press travels in one direction and rotates gears 35 and their respective chucks to cause engagement of pins 47 on drill 4 to twist the same, the entire chuck assembly, including member 43 may slide toward the left as shown in Fig. 14. The distance between the chucks of the two twisting fixtures 22 is thereby shortened as the bars shorten in twisting. When the head 20 has been stopped by its limit switch and reversed, the rotation of gear 35 and outer chuck housing 38 will be reversed and the pinions 47 will disengage the drill 4 as shown in Fig. 16. The drill 4 may then be removed without the necessity of twisting it so that the pins could follow the flutes. Compression springs 48 on shafts 44 by engaging housing 34 and member 43, are adapted to slidably return the chuck members to their initial position shown in Fig. 14. It is, of course, understood that the two twisting fixtures 22 shown in Fig. 10 are bisymmetrical.

When it is desired to twist a bar of different diameter the chuck pins 47 may be exchanged for chuck pins of a length adapted to engage a bar of that particular diameter. To change the lead or pitch of the twisted bar the stroke of the hydraulic press may be shortened or lengthened. To accommodate a bar of different length the twisting fixtures 22 may be slidably adjusted on the base member 23 as desired.

Figure 18:
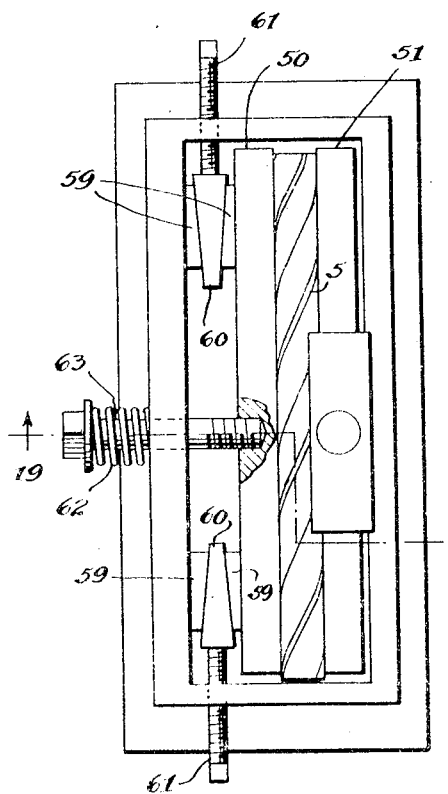
Fig. 18 is a plan view of the rolling plates.
Figure 19:
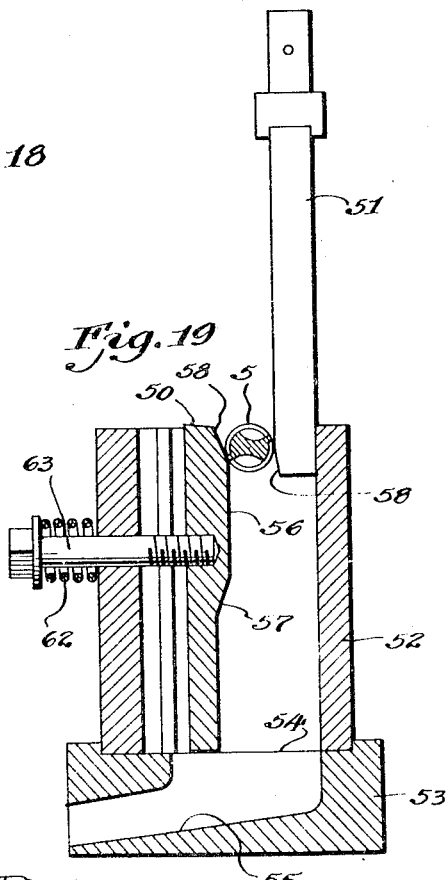
Fig. 19 is a vertical section of the rolling plates taken on the line 19—19 of Fig. 18.
Figure 20:
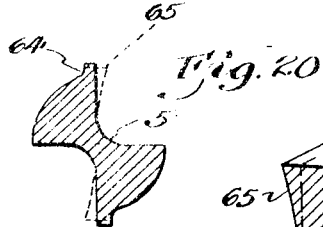
Fig. 20 is a cross section of the drill showing the hook formed on each cutting edge in dotted lines.
Figure 21:
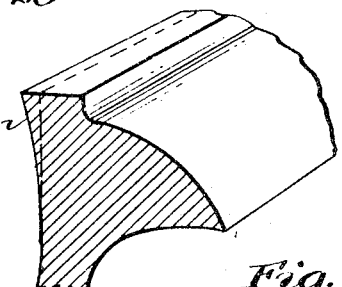
Fig. 21 is a perspective view of a portion of a drill showing the hook created by rolling between the plates of Fig. 19.
Figure 22:
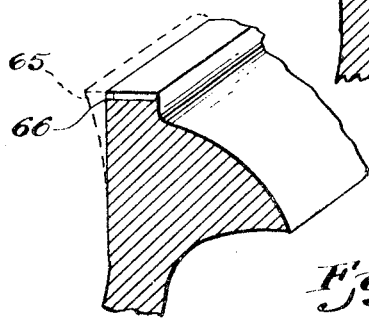
Fig. 22 is a perspective view of a portion of a drill showing the portions which are ground off after hardening to expose the cutting edge.

The next step of the process comprises a rolling operation performed upon the twisted bar. This rolling operation compacts the metal at the cutting lip, straightens the twisted bar longitudinally and throws a hook upon the cutting edge (as shown in Figs. 20 through 22). A device adapted to perform this operation is illustrated in Figs. 18 and 19. This device is adapted to roll the drill or bar between two relatively movable parallel plates 50 and 51. A hollow rectangular frame 52 is mounted upon a base 53. The plate 50 is mounted in the frame 52. The plate 51 is slidably mounted in the frame 52. Suitable power means (not shown) may be provided to cause vertical reciprocation of plate 51. An opening 54 and an inclined track 55 permit automatic disposal of the drill after it has been released by the plates. The upper portion of plate 50 is provided with its working surface 56. The lower part of plate 50 is recessed at 57 to release the drill when it reaches that position. The drill then falls by gravity through opening 54 and rolls down inclined track 55. The plates are preferably beveled along their coacting edges as at 58 to assure smooth engagement of drill 5. Plate 50 may be adjusted to take care of drills of different diameters. To this end cooperating wedges 59 and 60 comprise the back support of plate 50. An adjusting screw 61 threaded through frame 52 and fastened to wedge 60 permits relative movement of the wedges and thereby adjustment of plate 50. A compression spring 62 acting upon frame 52 and a rod 63 fastened to plate 50 is preferably used to resiliently take up any adjustment of the wedges.

A particularly good cutting edge is obtained by the method of manufacture herein described. It should be noted that the rolling operations performed by the rollers shown in Figs. 3 and 4 provide the bar with longitudinal beads 64. The twisting operation of the device shown in Figs. 10 through 17 made these beads helical (see numeral 5 of Fig. 1). Fig. 20 illustrates a cross section of the drill as provided with the beads 64. Rolling the drill between the plates of the device shown in Figs. 18 and 19 throws a hook 65 on these lips or edges of the drill. The hook 65 is shown in dotted lines in Fig. 22. Fig. 21 is a partial view of a drill provided with the hook 65. The reason for this hook 65 will now be described. It is necessary that the drill be hardened by proper heat treatment. All steels including high speed steel acquire a soft skin when heated over about 1400° F. Therefore, the hardening operation leaves a soft surface on the cutting edge. The hook 65 is ground off after the hardening operation to remove the soft skin and expose a hard cutting edge 66. The grinding may be done by any well known means. The hook 65 created by rolling the drill in the device of Figs. 18 and 19 might be said to be put there for the express purpose of temporarily taking the skin softness to be acquired in hardening the drill. The surfaces to be ground off are shown in Fig. 22. The section which is cross-hatched is the final cross section of the drill with the hook and top surface of the bead removed.

Figs. 23 through 30 illustrate various forms of the holder adapted to receive the drill. The form illustrated in Fig. 23 will be described first. The holder comprises a frusto-conical body portion 67. The body portion is provided with a cylindrical opening 68 adapted to receive the butt end of the drill. The body portion is also provided with the usual tang 69. This body portion is made laterally resilient by the presence of a plurality of longitudinal slots 70. Adjacent the base of the cylindrical opening 68 are provided two longitudinally parallel flat surfaces 71. The distance between these surfaces is less than the diameter of the opening and the surfaces are adapted to engage opposite sides of the butt end of the drill and prevent rotation of the latter as shown in Fig. 26. If necessary, sharp edges on the butt end of the drill may be ground off to permit a better engagement. The body portion being resilient is adapted to firmly engage the butt portion of the drill when lateral pressure is applied. Lateral pressure is applied by the drill chuck as illustrated in Fig. 27.

Figs. 28, 29 and 30 illustrate a form of the holder embodying several modifications. In this form of the holder, the flat surfaces 71 referred to previously are omitted and set screws 72 are substituted. The set screws may be tightened into the fluted section of the drill to prevent rotation of the latter. The set screws are preferably placed as near as possible to the base of the opening. Drills are softened on shank end by a lead pot immersion and therefore it is better that the torsion on the drill extend through the greatest possible amount of its length. This form of the holder is also provided with a second longitudinal opening 73. The opening 73 is threaded to receive a screw 74. Screw 74 is adapted to project into the opening 68 and by adjustment vary the length of the drill extending from the holder. Therefore, as the drill shortens by wear it may be compensated for by adjustment of the screw 74. Set screws 72 should be placed far enough along the body portion to permit this adjustment. A reinforced end 75 is preferably provided on the holder to receive the impact imparted by an operator when inserted in the chuck. It is common practice to strike a drill or such a holder with a blunt instrument.

What I claim is:

1. In the method of making twist drills the steps which comprise heating bar stock of multiple drill length to a temperature high enough to facilitate mechanical working, forming longitudinal flutes in the full length of said stock and simultaneously forming beads along alternate edges of said flutes, and twisting said fluted stock by torsional forces applied to opposite ends of said stock to drill form of uniform cross-sectional shape throughout its length.

2. In the method of making twist drills the steps which comprise heating bar stock of multiple drill length to a temperature high enough to facilitate mechanical working, forming longitudinal flutes in the full length of said stock and simultaneously forming beads along alternate edges of said flutes, applying a blast of air to a portion of said fluted stock to substantially equalize the temperature along the entire length thereof, twisting the fluted stock by torsional forces applied to opposite ends of said stock, cutting the twisted stock to length and grinding off some of the exterior surfaces of said beads.

3. The method of making twist drills which comprises heating bar stock of multiple drill length to a temperature high enough to facilitate mechanical working, rolling longitudinal flutes in said stock for its entire length and simultaneously rolling beads on alternate edges of said flutes, applying a blast of air to a portion of said stock to substantially equalize the temperature along the entire length thereof, twisting the stock uniformly for its entire length by torsional forces applied to opposite ends of said stock, rolling the stock between parallel relatively movable plates to contact only the beads and fashion into the base form of a cutting edge, cutting to length, hardening the twisted stock by heat treatment, grinding off the exterior surface of said beads and finishing the drill.

4. In the method of making twist drills those steps which comprise fluting and twisting multiple length bar stock for its entire length by torsional forces applied to opposite ends of said stock, forming beads along alternate edges of said flutes for their entire length, rolling the beaded and twisted stock between relatively movable plates to flow the metal of said beads inwardly to form hooks over their respective flute edges, heat treating the drill after the rolling step, and grinding off a resulting soft surface of the beads and rolled hook portions to expose hard cutting and wearing edges.

5. The method of making twist drills from round stock of multiple drill length which comprises flattening the stock, fluting the flat sides of the strip for the full length of the stock and twisting the fluted stock into a drill having a diameter substantially equal to that of the width of the flattened stock and substantially larger than the round stock, simultaneously forming beads along the leading edges of the lands between the flutes, working the beads of the full length of the stock around the leading edges of the lands to form excess portions, heat treating the drill, and removing the surface lands from the beads and the excess portions formed around the leading edges to expose hard cutting and wearing edges.

6. In the method of making twist drills from heated bar stock of multiple drill length, the steps which comprise passing the heated stock between rolls to form continuous flutes from one end of the stock to the other and simultaneously forming beads along the leading edges of the lands between the flutes, the rolls being so shaped and spaced that the metal forming said beads may flow unconfined laterally, twisting the stock, rolling the beaded and twisted stock between relatively movable flat plates to contact and roll the beads only of the stock to size and to cause the metal of the beads to flow circumferentially to form an excess of metal along the leading edges of the lands.

7. In the method of making twist drills from heated bar stock of multiple drill length, the steps which comprise passing the heated stock between rolls to form continuous flutes from one end of the stock to the other and simultaneously forming beads along the leading edges of the lands between the flutes, the rolls being so shaped and spaced that the metal forming said beads may flow unconfined laterally, air cooling a portion of the said stock length if necessary to insure a uniform pitch when the stock is twisted, twisting the stock, rolling the beaded and twisted stock between spaced flat surfaces to compact the stock to size and to cause the metal of the beads to flow circumferentially to form an excess of metal along the leading edges of the lands.

8. In the method of making twist drills from heated bar stock of multiple drill length, the steps which comprise passing the heated stock between rolls to form continuous flutes from one end of the stock to the other and during the same heat forming beads along the leading edges of the lands between the flutes, the rolls being so shaped and spaced that the metal forming said beads may flow unconfined laterally to form a definite surplus beyond the finished diameter of the drill, air cooling a portion of the said stock length if necessary to insure a uniform pitch when the stock is twisted, twisting the stock uniformly for its entire length by torsion forces applied to opposite ends of said stock, rolling the beaded and twisted stock between spaced flat surfaces to compact only the beads of the stock to size and to cause the surplus metal of the beads to flow circumferentially to form an excess of metal along the leading edges of the lands, hardening the drill and grinding away said excess metal.

HARRY W. DELANEY.

REFERENCES CITED

The following references are of record in the file of this patent:

UNITED STATES PATENTS

| Number | Name | Date |
|---|---|---|
| Re. 16,768 | Leidecker | Oct. 11, 1927 |
| 230,715 | Penney | Aug. 3, 1880 |
| 234,362 | Williams | Nov. 9, 1880 |
| 273,322 | Strange et al. | Mar. 6, 1883 |
| 274,943 | Hooker | Apr. 3, 1883 |
| 315,530 | Moore | Apr. 14, 1885 |
| 331,739 | Stetson | Dec. 1, 1885 |
| 339,544 | Graham | Apr. 6, 1886 |
| 430,792 | Taft | June 24, 1890 |
| 432,636 | Moore | July 22, 1890 |
| 443,297 | Sellers | Dec. 23, 1890 |
| 651,356 | Houser | June 12, 1900 |
| 758,041 | Barclay | Apr. 26, 1904 |
| 950,645 | Ward | Mar. 1, 1910 |
| 997,685 | McGarrity | July 11, 1911 |
| 1,106,928 | Denk | Aug. 11, 1914 |
| 1,341,636 | Deschauer | June 1, 1920 |
| 1,379,071 | Wineman | May 24, 1921 |
| 1,543,608 | Leidecker | June 23, 1925 |
| 2,148,805 | Cogsdill | Feb. 28, 1939 |
| 2,223,107 | Hurschman | Nov. 26, 1940 |